United States Patent [19]

Seitzer

[11] 4,190,558

[45] Feb. 26, 1980

[54] CATALYSTS FOR PREPARING AROMATICS FROM SYNTHESIS GAS

[75] Inventor: Walter H. Seitzer, West Chester, Pa.

[73] Assignee: Suntech, Inc., Philadelphia, Pa.

[21] Appl. No.: 949,490

[22] Filed: Oct. 10, 1978

Related U.S. Application Data

[60] Division of Ser. No. 890,331, Mar. 27, 1978, Pat. No. 4,139,550, which is a continuation-in-part of Ser. No. 722,292, Sep. 10, 1976, abandoned.

[51] Int. Cl.$^2$ .............................................. B01J 29/06
[52] U.S. Cl. ................................................ 252/455 Z
[58] Field of Search .............. 252/455 Z; 260/449.6 R

[56] References Cited

U.S. PATENT DOCUMENTS

| | | | |
|---|---|---|---|
| 4,086,262 | 4/1978 | Chang et al. | 252/455 Z |
| 4,096,163 | 6/1978 | Chang et al. | 252/455 Z |
| 4,097,364 | 6/1978 | Egan | 252/455 Z |
| 4,131,568 | 12/1978 | Bartish | 252/455 Z |

*Primary Examiner*—Carl F. Dees
*Attorney, Agent, or Firm*—J. Edward Hess; Donald R. Johnson; Paul Lipsitz

[57] ABSTRACT

Aromatic hydrocarbons useful as fuels are formed by passing a mixture of CO and hydrogen (synthesis gas) over a mixture of a copper-chromium promoted iron catalyst and a type Y mole sieve at elevated temperatures and pressures.

5 Claims, No Drawings

CATALYSTS FOR PREPARING AROMATICS FROM SYNTHESIS GAS

CROSS REFERENCE TO RELATED APPLICATIONS

This is a Division of Application Ser. No. 890,331 filed Mar. 27, 1978, now U.S. Pat. No. 4,139,550, which in turn is a continuation-in-part of Application Ser. No. 722,292, filed Sept. 10, 1976, now abandoned.

BACKGROUND OF THE INVENTION

This invention relates to a process for the conversion of CO and hydrogen to aromatic hydrocarbon mixtures which are useful as fuels in automobile engines and the like. More particularly, this invention relates to a one-step conversion of CO and hydrogen to said aromatics in the presence of a novel catalyst composition comprising a mixture of a promoted iron catalyst defined hereinbelow and a mole sieve also defined below.

Belgian Pat. No. 828,228 (together with corresponding British Pat. No. 1,495,794 and French Pat. No. 2,268,771) describes a process for the conversion of synthesis gas to a liquid product containing a high proportion of $C_5+$ olefins, isoparaffins and/or aromatics, using a CO-reduction catalyst in combination with a crystalline aluminosilicate (zeolite). This patent, however, requires that said zeolite have (1) an $SiO_2/Al_2O_3$ ratio of greater than 12; and, as defined by said patent, (2) a "constraint index" of 1 to 12; and (3) a "crystal framework density" of not less than 1.6 grams/cc.

By contrast, the present invention employs as the zeolite component a Y zeolite having an $SiO_2/Al_2O_3$ ratio of no greater than 6. Moreover, as the Belgian patent itself teaches, Y zeolites do not fall within its defined ranges of the constraint index and crustal framework density.

U.S. Pat. No. 3,972,958 and Storch et al, Fischer-Tropsch and Related Synthesis, John Wiley, New York, 1951, pp. 428-434 also bear on the subject of this invention.

SUMMARY OF THE INVENTION

In accordance with the present invention, it has now been found that synthetic fuels having a high aromatic content may be prepared in one step from synthesis gas, i.e., a mixture of CO and $H_2$, by contacting said gas with a novel catalyst composition comprising a mixture of a copper-chromium promoted iron catalyst and an aluminosilicate, both of which components are defined hereinbelow.

DESCRIPTION OF THE INVENTION

The process of this invention may readily be carried out by simply passing the synthesis gas over the catalyst mixture, preferably in pelleted form, in a conventional manner, e.g., in a fixed bed reactor. The synthesis gas should comprise an essentially pure mixture of CO and $H_2$, and especially should be free of $H_2S$, which would poison the catalysts of this invention.

The CO—$H_2$ mixture used herein is a well-known mixture of gases obtainable by conventional methods from methane, methanol, coal, or the like. The mole ratio of CO to $H_2$ should desirably be in the range of from about 1.5:1 to 1:1.5, and preferably should be about 1:1.

The rate at which the gas is passed over the catalyst, i.e., the gas hourly space velocity, is in the range of 1000 to 10,000, and preferably is 2000 to 4000. The temperature should be in the range of 300° to 350° C., preferably about 325° C., while the pressure is desirably 100–1500 psig, preferably about 500–750 psig.

The catalyst, as described above, comprises a physical mixture of a copper-chromium promoted iron catalyst and an aluminosilicate, i.e., a type Y mole sieve, both of which components are commercially available materials. This mixture desirably contains the two components in ratios of 0.1 to 10.0 by volume of the promoted iron catalyst to mole sieve, preferably about 1.0. The mixture is desirably used in pelleted form, as, for example, by using 20% by weight of an acid-washed inorganic oxide binder such as alumina.

The copper-chromium promoted iron catalyst component should desirably comprise about 1 to 20 wt. % copper; 1 to 20 wt.% chromium, and the remainder iron, i.e., from 60 to 98 wt.% iron. One example of this type of catalyst is a commercial preparation known as Girdler "G-8" (Girdler Catalysts, Louisville, Ky., a division of Chemtron Corporation), which contains 90 wt.% iron, 7 wt.% copper (as the oxide) and 3 wt.% chromium (as the oxide).

Alternatively, a like promoted iron catalyst component may be routinely prepared using a simple mixture of copper chromite and iron, preferably but not essentially in a 1:1 to 1:2 volume mixture.

In some cases it is desirable, but not essential, to promote the iron further with less than about 2% alkali or alkaline earth oxides in order to maximize the yield of liquids as opposed to gaseous products.

The aluminosilicate is a commercially available material, i.e., an HY mole sieve (conventionally obtained by heating an ammonium-exchanged Y mole sieve, e.g., at 450°–500° C., to drive off water and ammonia) which contains less than 0.2 wt.%, of sodium cations, generally about 0.12%, an $NH_4O$ content of less than 4 wt.%, generally about 3.9%, (Linde Catalyst Base 33-200; Union Carbide Corp.), and has an $SiO_2/Al_2O_3$ ratio of less than about 6, preferably about 5.9. After pelletizing with an alumina binder, the $SiO_2/Al_2O_3$ ratio may decrease, for example, to about 3.3.

The product of this novel process is a liquid mixture having a boiling range of about 38° to 350° C., and typically contains about 25–50% by weight aromatics and a low concentration of carbonyl compounds, generally not more than about 10%, which mixture is useful as an automotive fuel.

EXAMPLE 1

The invention will now be illustrated by the following examples in which a series of cuts of synthesis gas was contacted with the iron-mole sieve catalyst of the invention at varying GHSV's, temperatures, pressures, and the like.

The various parameters and results are shown in Table I below. It should be noted that in a similar run using the iron catalyst alone without the mole sieve produced a mixture showing high carbonyl and low aromatic content, while a run using the mole sieve along under the given conditions gave no product at all.

In the following runs a pelleted mixture of 14–20 mesh catalyst comprising 5 cc Girdler "G-8" copper-chromium promoted iron catalyst and 5 cc Linde "33-411" (i.e., 33-200 base catalyst plus binder) ultrastable hydrogen Y catalyst was charged into a fixed-bed reactor. A mixture of CO-$H_2$ was fed down over the catalyst at 75 psig. The product was condensed in an ice water condenser and the gases passed through a dry ice trap and wet test meter. The conditions and results are set forth in Table 1.

The CO and H₂ were then passed over the resulting catalysts under the conditions set forth below in Table II, and the liquid products analyzed with the following results:

TABLE I
LIQUID PRODUCTS FROM CO/H₂

| Hourly Cut | Catalyst | T° C. | GHSV | H₂/CO | Wt. % Yield | % By FIA* Ar. | % By FIA* Olef. | % By FIA* Sat. | BOILING RANGE °F. 5% | BOILING RANGE °F. 50% | BOILING RANGE °F. 95% |
|---|---|---|---|---|---|---|---|---|---|---|---|
| 1 | G-8 + HY | 300 | 1100 | 1.3 | 5.7 | 40 | | | 150 | 275 | 371 |
| 2 | | 300 | 1100 | 1.3 | 8.6 | 33 | | | 137 | 265 | 443 |
| 3 | | 300 | 1100 | 1.1 | 12.4 | 33.0 | 32.6 | 34.4 | 108 | 283 | 572 |
| 4 | | 300 | 2200 | 1.1 | 8.9 | 40.7 | 39.0 | 20.3 | 109 | 259 | 510 |
| 5 | | 300 | 2200 | 1.1 | 7.1 | 25 | | | 155 | 236 | 576 |
| 6 | | 325 | 2200 | 1.1 | 5.3 | 47.2 | 27.9 | 22.9 | 196 | 366 | 615 |
| 7 | | 325 | 2200 | 1.1 | 7.1 | 24 | | | 114 | 258 | 525 |
| 8 | | 325 | 3300 | 1.1 | 2.4 | 50 | | | 146 | 302 | 582 |
| 9 | G-8 | 300 | 1100 | 1.1 | 10.3 | 17.4 | 19.6 | 63.0 | 167 | 308 | 560 |
| 10 | | 325 | 1100 | 1.1 | 8.3 | | | | 157 | 298 | 544 |
| 11 | | 300 | 2200 | 1.1 | 18.6 | 15.7 | 62.8 | 21.5 | 108 | 283 | 572 |
| 12 | | 300 | 2200 | 1.1 | 8.6 | 14.6 | 72.6 | 12.8 | 197 | 321 | 544 |
| 13 | HY | 325 | 200 | 1.3 | 0 | | | | | | |

*Fluorescent Indicator Analysis

TABLE II
LIQUID PRODUCTS FROM CO/H₂

| RUN | CATALYST | PRESS. (psig) | T° C. | GHSV | H₂/CO | Yield, % C | Boiling Range °F. 5% | Boiling Range °F. 50% | Boiling Range °F. 95% | I.R. Absorbance C=O | I.R. Absorbance C=C AR | I.R. Absorbance Olefin Trans | I.R. Absorbance Olefin Vinylidene |
|---|---|---|---|---|---|---|---|---|---|---|---|---|---|
| A | [G-8 + 2% K₂CO₃] + HY | 750 | 325 | 1100 | 1.1 | 15.4 | 92 | 301 | 554 | None | .242 | Low | Low |
| B | | 750 | 300 | 2200 | 1.1 | 21.5 | 92 | 226 | 419 | Low | .123 | High | .423 |
| 1 | 100FE:10 Cu: 0.5 K₂CO₃ + HY | 500 | 300 | 1100 | 1.1 | 24.3 | 135 | 338 | 633 | N.A. | N.A. | N.A. | N.A |
| 2 | | 350 | 300 | 1100 | 1.1 | 10.2 | 196 | 430 | 809 | Very High | Low | High | High |
| 3 | | 500 | 300 | 1100 | 1.1 | 16.6 | 171 | 558 | 811 | Very High | " | " | " |
| 4 | | 500 | 325 | 1100 | 1.1 | 27.2 | 116 | 348 | 771 | Very High | " | " | " |
| 5 | | 500 | 325 | 2200 | 1.1 | 25.4 | 146 | 363 | 766 | Very High | " | " | " |

N.A. = No Aromatics

EXAMPLE 2

Iron (ferric) and copper (cupric) in the ratio of 100:10 as nitrates were dissolved in water and a 5% excess of sodium carbonate was added to precipitate out the metal hydroxides. This solid was washed fairly well with water (but not until nitrate free) and 0.5 part K₂CO₃ added with enough water to make a paste. Following this the precipitate was dried in the oven, charged to the reactor and reduced in hydrogen at 450°–475° C. to yield a Fisher-Tropsch catalyst comprising 100 Fe:10 Cu:0.5K₂CO₃.

This material was then mixed in a 1:1 ratio by volume with an HY mole sieve containing about 0.12 wt.% of sodium cations, an NH₄O content of about 3.9 wt.%, (Linde Catalyst Base 33-200; Union Carbide Corp.), and having an SiO₂/Al₂O₃ ratio of about 5.9, as defined above.

A similar catalyst was prepared by adding 100 parts of a copper-and-chromium promoted iron catalyst (Girdler "G-8"-Girdler Catalysts), as defined above, to 2 parts of K₂CO₃ in water to make a paste and heating the same until dry to yield a catalyst comprising 100G-8:2K₂CO₃. This material was then mixed with the HY mole sieve in a 1:1 ratio by volume.

Based on the above results, in Runs 1 to 5, it will be seen that the combination of a Fisher-Tropsch catalyst, as taught by Storch, when mixed with an HY zeolite, and contacted with CO and H₂ yields, at most, insignificant traces of aromatic products as compared with the yields provided by the novel catalyst claimed herein, and as compared with a like copper-chromium-containing catalyst shown in Runs A and B above.

EXAMPLE 3

A series of seven runs, similar to those of Example 1, was carried out using varying combinations of catalyst components. As will be seen below in Table III, Run A employed no chromium, Runs B and C employed no copper, while Run D employed neither copper nor chromium. From these four runs the high carbonyl content of the resulting product confirm that both copper and chromium are needed for aromatization. That is to say, it has been found from studies made in the course of the invention that aromatization is always accompanied by low carbonyl content so that the key analysis of the liquid products is the infra red analysis for carbonyls.

The findings that both copper and chromium are needed for aromatization is confirmed in Run E, where the presence of both of these components with the zeolite-iron mixture yields aromatics.

In Run F, containing 50-50 volume ratio of iron and copper chromite, the carbonyl content of the product was relatively low, even without the zeolite. This product was analyzed further, as was the liquid from Run G which was made with all four components, i.e., copper, chromium, iron and zeolite.

In Table IV the products from Runs F and G were analyzed by fluorescent indicator analysis to give an "aromatics" fraction. Since carbonyls would also come out in this fraction, it was further analyzed by mass spectrometry to find the true aromatic content. This turned out to be 3% when no zeolite was used, compared with 19% in the four component system.

TABLE III

| | Dependence of Aromatization on Catalyst Composition | | | | | |
|---|---|---|---|---|---|---|
| | Catalysts reduced at 450° C. for 1 hour at 1 atmos. $H_2$, then ½ hour at 475° C. and 68 atoms $H_2$. Charge 1:1 $H_2$:CO at 50 atmos. | | | | | |
| Run | Catalyst (Volume Ratio)* | GHSV | °C. | CO Conversion | % Liquid Yield | Carbonyls (by I.R.) |
| A | Iron(40), YZ(40), Copper(20) | 1200 | 300 | 60 | 27 | High |
| B | Iron + 5% $Cr_2O_3$(50), YZ(50) | 1200 | 290 | 81 | 56 | High |
| C | Iron(40), YZ(40), Chromia(20) | 1200 | 290 | 83 | 57 | High |
| D | Iron(50), YZ(50) | 1200 | 290 | 74 | 47 | High |
| E | Iron(40), YZ(40), CuCr(20) | 1800 | 296 | 95 | 67 | Low |
| F | Iron(50, CuCr(50) | 1200 | 300-325 | 80 | 40 | Low |
| G | Iron(40), YZ(40), CuCr(20) | 1200 | 300-325 | 84 | 31 | None |

*Iron = ICI 35-4, (Imperial Chemical Industries) iron catalyst;
YZ = 33-411, Linde Y zeolite;
Copper = T-317, Girdler copper catalyst;
Chromia = CrO 101, Harshaw chromia-alumina;
CuCr = G-13, Girdler copper chromite.

TABLE IV

| | ANALYSES OF LIQUID PRODUCTS | | | | |
|---|---|---|---|---|---|
| Run | Fluorescent % "Aromatics" | Indicator % Olefin | Analysis % Saturates | M.S.* % Aromatics in FIA "Aromatics" | Actual % Aromatics |
| F | 23 | 20 | 57 | 13 | 3 |
| G | 33 | 49 | 18 | 56 | 19 |

*M.S. = mass spectrometer

The invention claimed is:

1. A catalyst composition useful for converting CO and hydrogen to aromatic fuel mixtures comprising a copper-chromium promoted iron catalyst in admixture with type Y molecular sieve having a sodium cation content of less than about 0.2 wt.%, an $SiO_2/Al_2O_3$ weight ratio of less than about 6.0, and an $NH_4O$ content of less than about 4 wt.%, wherein the volume ratio of iron catalyst to molecular sieve is about 0.1 to 10.0.

2. The composition of claim 1 wherein the volume ratio of iron catalyst to mole sieve is 1.0.

3. The composition of claim 1 wherein the catalyst mixture is in pelleted form in combination with an inorganic oxide binder.

4. The composition according to claim 1 wherein the promoted iron catalyst component comprises 1 to 20 wt.% copper, 1 to 20 wt.% chromium, and 2 to 98 wt.% iron.

5. The composition according to claim 1 wherein the promoted iron catalyst component is a 1:1 to 1:2 volume ratio mixture of copper chromite and iron.

* * * * *